Oct. 29, 1929.   I. E. McCABE   1,733,615
TRANSMUTATION OF VISIBLE LIGHT RAYS TO ACCOMPLISH PHYSICAL WORK
Filed Sept. 7, 1926   3 Sheets-Sheet 1

INVENTOR.
IRA E. McCABE
BY Langdon Moore
ATTORNEYS.

Oct. 29, 1929.  I. E. McCABE  1,733,615
TRANSMUTATION OF VISIBLE LIGHT RAYS TO ACCOMPLISH PHYSICAL WORK
Filed Sept. 7, 1926  3 Sheets-Sheet 2

INVENTOR.
IRA E. McCABE
BY Langdon Moore
ATTORNEYS.

Oct. 29, 1929.  I. E. McCABE  1,733,615

TRANSMUTATION OF VISIBLE LIGHT RAYS TO ACCOMPLISH PHYSICAL WORK

Filed Sept. 7, 1926  3 Sheets-Sheet 3

INVENTOR.
IRA E. McCABE
BY
ATTORNEYS.

Patented Oct. 29, 1929

1,733,615

UNITED STATES PATENT OFFICE

IRA E. McCABE, OF CHICAGO, ILLINOIS

TRANSMUTATION OF VISIBLE LIGHT RAYS TO ACCOMPLISH PHYSICAL WORK

Application filed September 7, 1926. Serial No. 133,868.

This invention relates to improvements in transmuting light and more particularly to the transmutation of visible light rays to accomplish physical work and also to the exclusion of the invisible rays in such a device.

Physics teaches us that light travels in waves which carry energy with them and that the wave length of light increases from the violet to the red end of the visible spectrum. It also teaches that there are invisible light rays beyond each end of the spectrum, rays of less length beyond the violet end, such as ultra-violet rays, X-rays, etc., while there are rays of greater wave length beyond the red end of the spectrum, such as infra-red rays, wireless rays, etc. Likewise it is recognized that the energy of light waves exert a heating effect upon bodies on which they fall. This is true of the light rays forming the visible spectrum, as well as of the invisible rays extending beyond each end thereof. Likewise the invisible infra-red rays are sometimes termed "heat radiation" as they produce more heat than the visible or ultra-violet rays.

It is recognized that rays of light travel in a straight line and may be reflected, pass through, or absorbed in accordance with the nature of the surface and nature of the object upon which they fall. A ray of light falling upon a polished surface at an angle will be reflected, while the same ray of light falling upon a body having an adiathermanous surface, such as a covering of lamp black, will be absorbed and the energy carried by the light ray will be transformed into heat and the temperature of the body with the adiathermanous surface will be greatly increased. The visible rays of light pass through certain substances, such as window glass, and natural crystals, such as quartz, which are usually termed "transparent bodies," and in passing through such medium will lose but little of the energy carried by them. Such transparent bodies are nearly opaque to the invisible vibrations of longer period, such as the infra-red rays.

This invention relates particularly to the application of the principle that transparent bodies of different materials and different colors transmit light waves in different proportions and absorb that part of the colors of the visible spectrum not reflected or transmitted. In the latter case an absorbed ray or radiant energy is converted into heat. As above stated, the invisible infra-red ray sometimes called "radiant energy" will increase the temperature of an object upon which it falls to a higher degree than if the same object were exposed for the same length of time to the light rays only of the visible spectrum.

In my co-pending application, Serial No. 101,588, filed April 12, 1926, an example of a commercial application of radiant energy in connection with the operation of a mercury tube switch has been described. A particular example disclosed in said application comprises a mercury tube switch constructed of a sealed glass tube having a restricted central portion which joins two enlarged bulb-like end portions with the restricted portion bent at its center so that adjacent surfaces of the enlarged bulb-like ends are close together forming the restricted portion in the shape of a V or U. The central restricted portion contains sufficient mercury when the plane passing through the center lines of the enlarged bulb portions is vertical to cause the mercury to form a seal between the two enlarged portions. Electrodes, or electric terminals, are secured in each bulb portion and of such relation that when the level of the mercury in the restricted portion is in the same plane in both legs, one terminal will be above the surface of such mercury and the other terminal immersed therein. The enlarged bulb portions are sealed, and if each present the same area of surface and are of the same material, then rays of radiant energy either visible or invisible will have no effect upon the contained atmosphere or gases within the sealed bulb portions except to increase the pressure in each bulb equally. However, if the surface of one bulb is covered with an adiathermanous substance, such as lamp black, and the switch is exposed to sun-light or any other source of light, the rays falling upon the blackened bulb will be absorbed, while the rays falling upon the other bulb will be reflected or pass through. The adiathermanous substance will transmute the energy of the light rays into heat causing the temperature of the enclosed gas to rise thereby causing it to expand, overcome the pressure in the other bulb and force the column of mercury in the V-shaped restricted portion to travel over into the other bulb, whereby electric contact is either made or broken between the electrodes, in accordance with their original relation to the normal surface of the mercury.

One object of this invention is to apply the results obtained by light rays falling on and passing through substances that produce the effect of color. When a visible ray of light from the sun, flame, or electric lamp falls upon an object and the object appears colored, science teaches that all of the rays producing the visible spectrum are absorbed by the object except those that produce the color shown and the latter rays are reflected by the object. In the case of transparent bodies which produce the effect of color when held between the observer and the source of light, all the rays of the visible spectrum except those that produce the color seen are absorbed in the medium through which the light passes and only those rays of the visible spectrum pass through the medium which produce the color effect. Therefore, in a colored transparent body, such as colored glass, the energy of the absorbed rays generates heat so that the temperature of the colored transparent medium is raised above that of the surrounding atmosphere. It has been found that media of certain color, as well as of certain substances, absorb more energy from the light rays than others. This invention contemplates the substitution of a colored glass or transparent medium for the bulb having the blackened surface described in the above described device. It has been found that a device as above described employing lampblack as a surface on one bulb will absorb the infra-red rays when subjected to them without the presence of visible light and operate the switch. In other words, the switch with the adiathermanous covering will operate in the dark upon the increase and decrease of invisible heat, furthermore, as the absorption and emission of radiant energy of the same surface are equal, a reduction in the temperature surrounding such a switch while subjected to either the visible or invisible rays of light or radiant energy, as by a current of air passing about it, will cause the adiathermanous substance of one bulb to lose its absorbed radiant energy to such an extent as to effect its proper functioning.

To prevent such action, a colored glass is substituted for the lamp-black covered bulb and the clear transparent bulb is formed of a glass that will absorb the infra-red rays at approximately the same rate as the colored bulb. While glass is transparent to the vibration of the rays of visible light, it is nearly opaque to the invisible vibrations of longer periods, such as the infra-red rays, also glass presenting a polished surface will reflect radiant energy with less absorption than a roughened surface, and in transmitting or allowing visible light rays to pass through, or in reflecting light rays, glass will absorb a certain proportion of the energy thereof, differing with the character and color of the glass so that increase or decrease in the surrounding temperature without the presence of visible rays of light will heat or cool both bulbs at approximately the same rate. When this device is subjected to visible light, the clear transparent bulb will reflect or transmit the visible rays while the colored bulb will absorb all the rays of the visible spectrum other than those producing its color and in so doing increase the temperature of the bulb, above the temperature of the other, independently of the temperature of the surrounding atmosphere, cause the contained gas to expand and operate the switch. Conversely, when the source of light is removed the increased temperature of the colored bulb is quickly reduced to that of the surrounding atmosphere.

A practical application of this device is a control for an electrically operated oil burner mechanism in which the switch is placed adjacent the combustion chamber of the burner mechanism and so arranged that the light from the burner flame may fall upon it.

From the above description it is seen that as soon as the burner flame is ignited, the switch will be operated and upon the failure of the burner flame, the switch will be operated in the opposite direction, irrespective of the infra-red rays of radiant energy that may emanate from the heated combustion chamber after the flame is extinguished.

This invention contemplates not only the substitution of a colored glass or transparent medium for the bulb having the blackened surface in the above said application describing such a device, but also the interposition of a screen of transparent material having the property of intercepting the infra-red rays emanating from a source of light, where desirable. In such a device, the temperature of the clear or transparent bulb remains approximately the same as the surrounding atmosphere, if the infra-red rays have been intercepted by the screen, and the visible light passing through the screen is reflected to a small degree and passes through the clear or transparent bulb with but little absorption while the rays of light passing through the screen and falling upon the bulb of colored material will be partly reflected and the remaining rays absorbed to a greater degree than in the other bulb. Only that portion of the visible spectrum which produces the color of the bulb will be reflected or transmitted while the remainder of the rays of the visible spectrum will be absorbed by the wall of the colored bulb so that the energy of the absorbed rays will increase the temperature of that bulb above the other bulb, whereby the gas in the colored bulb will expand and operate the switch in the manner described. As soon as the source of light is extinguished or removed the colored bulb will immediately return to its normal temperature which is also the normal temperature of the other bulb whereby the switch is operated to return to its normal condition.

A practical application of this device is a control for an electrically operated oil burner mechanism in which the switch is placed adjacent the combustion chamber of the burner mechanism, which in most circumstances is a circular of rectangular construction fire brick, and so arranged that the light from the burner flame may fall upon it, with the screen above mentioned placed between the interior of the combustion chamber and the mercury tube switch. From the above description it is seen that as soon as the burner flame is ignited, the switch will be operated and upon the failure of the burner flame, the switch will be operated in the opposite direction. In a construction of this kind, after the burner flame has been burning for any length of time the bricking of the combustion chamber will become heated to a high degree and upon the extinguishing of the burner flame, the heated fire brick will emanate infra-red rays. If the mercury tube switch, as above described, was not separated from the fire box by the screen, the infra-red rays emanating from the fire box would cause the temperature of both bulbs and the gas contained therein to rise so that it would necessitate a much greater increase in temperature in the colored bulb to overcome the pressure in the clear bulb than if both were at atmospheric temperature, and therefore take more time before the switch would operate in either direction, so that it can be seen the interposition of the screen causes the apparatus, when employed in this connection, to operate positively and quickly whenever the burner flame is ignited or becomes extinguished.

While the embodiments illustrated in the accompanying drawings show constructions to which this invention has been applied, it is to be understood that they are merely illustrations and that the scope of this invention is not limited thereby.

Figure 1:
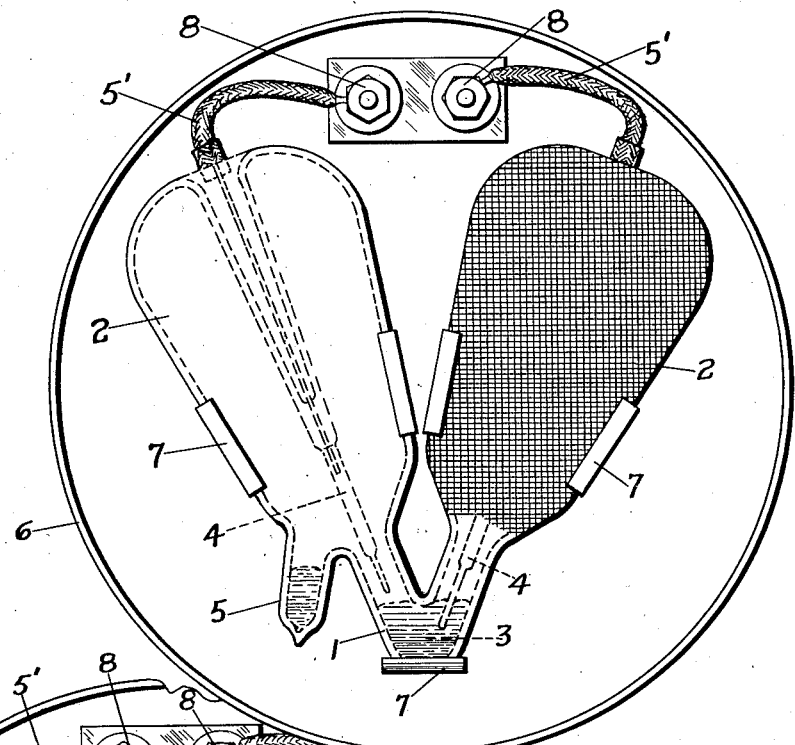
Figure 1 is a view in front elevation of the light-actuated switch employing an adiathermanous covering on one bulb.

Since this application refers to the applicant's prior pending application, Serial Number 101,588, April 12, 1926, in describing the present invention, Figure 1 of the drawing illustrates an embodiment thereof in which the restricted portion 1 is bent in the form of a V, joins the enlarged bulbular end of the portions 2, and contains sufficient mercury 3 in the base of the V to form a seal between the bulbs. The electrodes 4 are sealed in the bulb walls and are connected to the binding posts 8 on casing 6 by the flexible leads 5¹, the bulbs 2 and base of the V are supported upon the back of the casing by clips 7. The right-hand bulb 2 is covered with an adiathermanous substance, such as lamp-black, and the terminal or electrode in that bulb is immersed in the mercury when its level is the same in both legs of the V, and the other electrode terminates short of the surface of the mercury, as shown in the full lines in Figure 1. When this device is subjected to the light from the sun, flame or electric lamp, the adiathermanous substance on the bulb absorbs the radiant energy therefrom, converts it into heat, expands the gas in that bulb, forces the mercury downward in the adjoining leg causing the level to rise in the other leg and contact with the electrode in the other bulb, thereby completing the circuit between the two binding posts. When the sources of light is removed, the heat of the covered bulb is radiated into the surrounding atmosphere, the pressure of the gas therein decreases and the mercury returns to the same level in both legs, breaking the circuit as the surface of the mercury leaves the electrode in the left-hand bulb.

Figure 2:
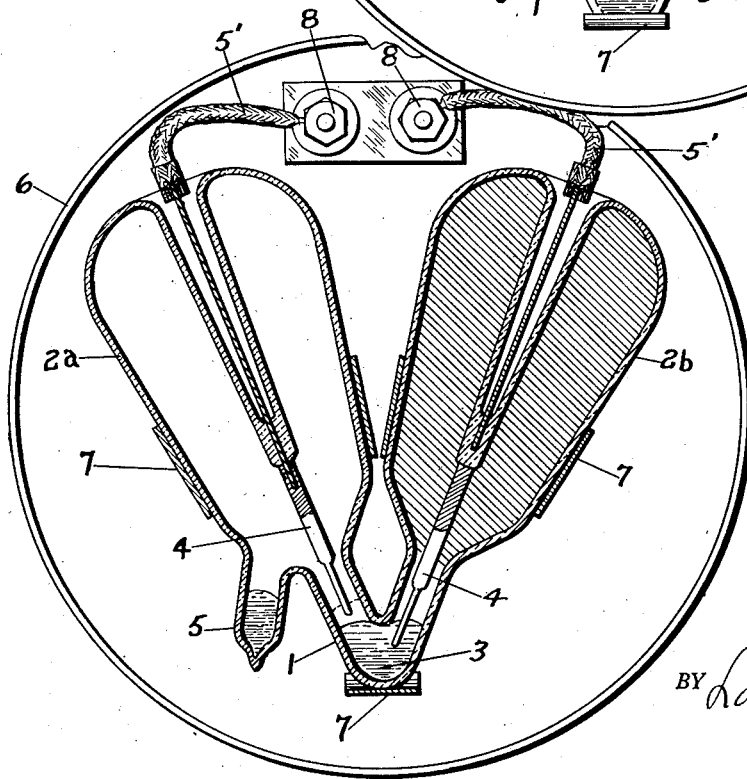
Figure 2 is a vertical central sectional view through a switch of similar construction in which a colored glass bulb has been substituted for the covered bulb of Figure 1.

Figure 2 is a sectional view of a similar device illustrating the present invention and in which similar reference numerals refer to corresponding parts. In this form, the restricted portion 1 and left-hand bulb 2ª are integral and of a clear transparent glass while the right-hand bulb 2ᵇ is of green glass and welded to the adjoining restricted portion. In this construction, the bulb 2ᵇ may be of commercial green bottle glass and the clear bulb 2ª is of any kind of clear glass that allows light of the visible spectrum to pass therethrough and absorbs infra-red rays at approximately the same rate as the green bottle glass. The green bulb 2ᵇ absorbs the rays of the visible spectrum except those reflected to produce the green color and this latter form acts in the same manner as that illustrated in Figure 1 to close and break the circuit through the electrodes to the binding posts 8. The green glass form has this important advantage over the one employing an adiathermanous covering, it is operated only upon being exposed to the action of visible light. In the first form, the adiathermanous substance covering absorbs energy from both visible and infra-red rays, so that the presence of radiant energy in the absence of visible light will operate the switch, as an increase in the temperature of the surrounding atmosphere is absorbed by the covered bulb more rapidly than by the clear bulb, and in the presence of both heat and light, the pressure in both bulbs is increased above normal and delays the action of the switch, likewise upon the removal of the light, the presence of heat may either maintain the switch closed or delay its operating. In the green bulb form both bulbs being of material that absorb radiant energy from infra-red rays, approximately at an equal rate, the presence of heat alone will not operate the switch, merely increase the pressure of the gas in both bulbs equally, but as soon as the device is subjected to visible light, the green bulb absorbs the energy of the other visible spectrum rays increasing the temperature of the green glass walls and causes the pressure therein to close the electric connections through the mercury, likewise upon the removal of the source of light, the increased temperature of the green glass bulb is radiated into the surrounding atmosphere until the temperature of both bulbs is again approximately equal. While green glass has been illustrated and described as the material forming the bulb designed to absorb energy from the visible spectrum, it is only cited as an example as other colored glasses are contemplated by this invention which will produce a similar result in varying degrees, as set forth in the "Scientific Papers of the Bureau of Standards", No. 325, published August 8, 1918, entitled "Spectroradiometric investigation of the transmission of various substances", particular reference being made to "various glasses", as treated under III, Group 2, in said publication.

When it is not desirable or where it is impractical to construct both bulbs of glass having about the same rate of absorption of infra-red rays, the same result may be obtained, by placing a screen of infra-red rays absorbing medium between the source of light and heat and the device. Most clear glasses have the property of transmitting the rays of the visible spectrum and absorbing most of the energy of the infra-red rays, such as ordinary window glass, although boro silicate glass is more particularly suitable owing to its ability to withstand higher temperature.

Figure 3:
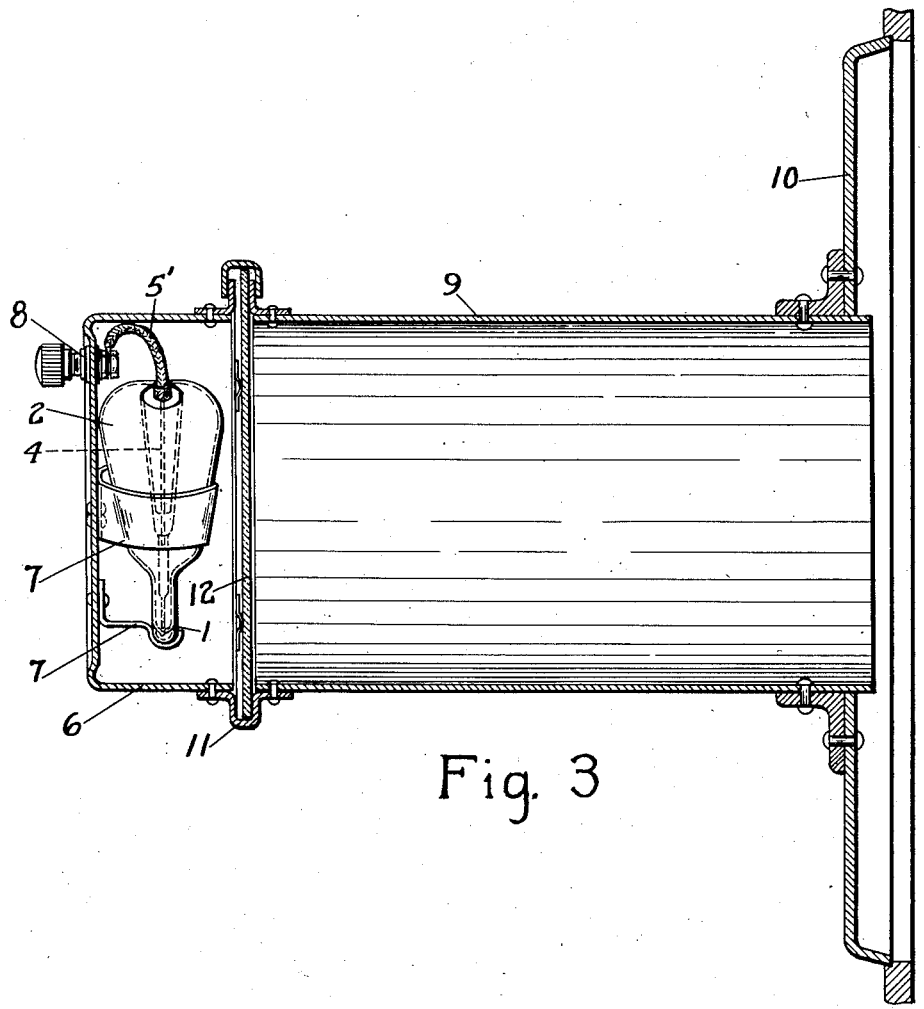
Figure 3 is a view in central longitudinal section illustrating the construction employed in adapting this invention to an electric control for an electrically-operated liquid fuel burner as applied to a domestic heating plant.

Figure 3 illustrates a practical application of this invention, in connection with an electrically-operated liquid fuel heating plant in which the fire door 10, or side of the furnace wall, is provided with an opening about which is secured a tubular casing 9, the exterior end of which supports the casing 6 of this improved mercury switch just described and is so arranged that light emanating from the burner flame will fall upon it. The casing 9 is provided with a transverse slotted frame 11 through which a screen of Pyrex glass 12 may be inserted. The interposition of the Pyrex screen absorbs the infra-red rays and radiant heat that will emanate from the fire box of the heater, not only while the burner is operated but which will continue after the flame is extinguished until the temperature of the interior of the heater falls to that of the surrounding atmosphere.

Figure 4:
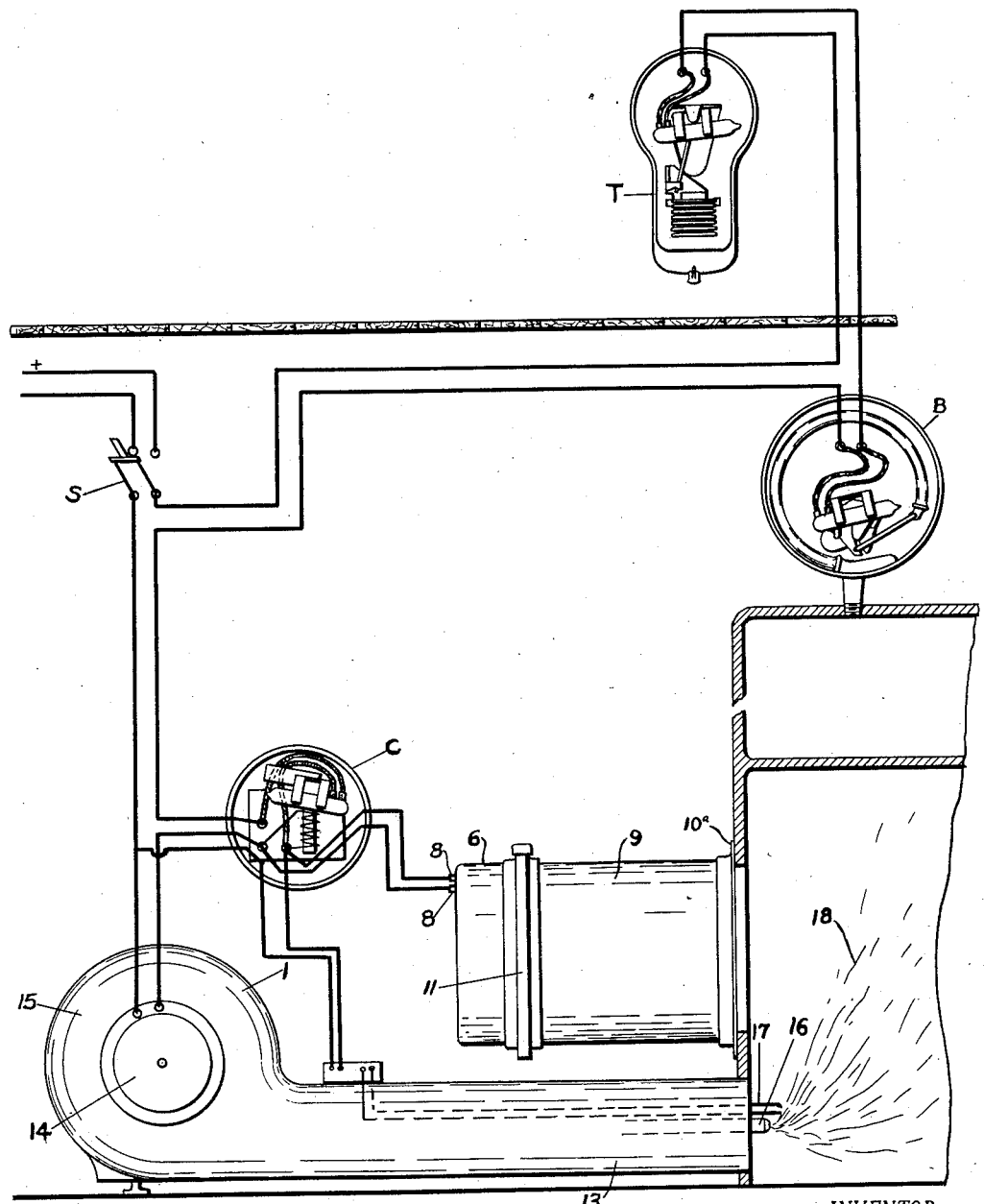
Figure 4 is a diagrammatical view of this device in connection with a domestic liquid fuel burner, partly in side elevation, partly in section, with the wiring in diagram.

In Figure 4, the casing 9 is illustrated as attached to the wall 10$^a$ of a domestic heater or furnace to which a domestic liquid fuel burner of commercial type has been applied, which burner includes a draft pipe 13 entering the heater wall below the casing 9 in the type of furnace illustrated. An electric motor 14 operates a fan blower in the casing 15 to force air through the draft pipe 13 to mix with the spray of oil issuing from the nozzle 16, which is shown in connection with a spark ignition device 17 to ignite the mixture of oil and air to produce the flame 18. Rays of light emanating from the flame will enter into the casing 9 and fall upon the switch contained at the far end thereof. The operation of the burner is controlled by a room thermostat T and a boiler control B connected in series with the motor 14 and commercial line, the latter being controlled by a manually operated switch S. A safety control C is interposed in series in the electric circuit between the boiler control B and the motor 14 and also in circuit with the binding post 8 on the switch casing 6. This control C may be of any type, preferably one which will, upon closure of the circuit by operation of the room thermostat T, close the circuit through the motor 14 and ignition device 17, to supply fuel and ignite the same, when the circuit has been closed by the light operated switch in casing 6, cut out the ignition device, and if the burner flame fails, the light switch will operate to break the circuit between binding posts 8 which will operate a safety switch to break the motor circuit. The control C here illustrated is one described in my prior pending application Serial No. 113,906, filed June 5, 1926 which matured November 8, 1927 in Patent No. 1,648,389, and controls the motor circuit through the light operated switch. This control comprises a pivoted mercury tube safety switch having the counterweight adapted to normally hold the switch in open position and a thermally operated member adapted to engage and hold the switch in closed position, so that when the full current of the circuit passes through the safety switch and about the thermal member, it will release the safety switch to break the circuit, and is provided with a shunt circuit in connection with the binding post 8 of the light switch in casing 6, so that upon completion of the circuit through the light switch, sufficient current will pass therethrough to allow the thermal member to hold the safety switch in closed position. The thermal member is so adjusted that sufficient time may elapse after closing the motor circuit to allow the burner flame to close the light switch before the safety switch is released so that if the room thermostat closes the motor circuit and the flame fails to ignite, the thermal member will release the safety switch, or after ignition, the burner flame becomes extinguished while the motor is operating, the thermal member will release the safety switch to break the motor circuit.

A switch of this improved construction placed in the electric circuit to the motor of an electrically-operated liquid fuel heating system will operate to break the circuit immediately upon the failure of the burner flame and provides a new, simple and positive safety device for such systems.

This particular embodiment of this invention as above illustrated and described is but one of the many uses thereof. It is obvious that this invention can be applied to the operation of signals, advertising signs, illuminated signs and as a control for an electric circuit of any character which is desired to be operated by visible light and still be within the scope of this invention. This invention also contemplates the use of lenses to concentrate the rays of light where it is desirable to locate the switch at a distance from the source of light or when it is desirable to reduce the size of the instrument. It is also possible, by proper selection of the glasses of the two bulbs whereby the operation of the switch may be varied and the switch may be operated by the infra-red rays irrespective of moderate variations in the temperature of the surrounding atmosphere. Also by selecting proper glasses for the bulb and screen, it is possible to operate the switch at various points of the visible or invisible spectrum which would be adaptable for a temperature control for the governing of excessive temperatures, such as the refining of metal or other materials, or the hardening and heat treatment of the same.

What I claim is:

1. A device for transmuting the energy of visible light rays, comprising two interconnected sealed gas containers having a movable seal therebetween, the walls of one container being constructed of a transparent medium and the walls of the other of a medium adapted to absorb a part of the rays of the visible spectrum exclusive of the invisible rays, whereby when the device is subjected to visible light, the absorbed rays increase the temperature of the walls of that container, expand the gas contained therein, and impart a movement to the enclosed seal in the direction of the other container.

2. A device for transmuting the energy of visible light rays, comprising two interconnected sealed gas containers having a movable seal therebetween, the walls of one container being constructed of a transparent medium and the walls of the other of a medium adapted to absorb a part of the rays of the visible spectrum exclusive of the invisible rays, and the provision of a transparent screen adapted to absorb the infra-red rays between the containers and the source of light, whereby the infra-red rays are prevented from falling upon the containers, the absorbed rays of the visible spectrum increasing the temperature of one container and expanding the gas contained therein to move the interposed seal in the direction of the other container.

3. A device for transmuting the energy of visible light rays to the exclusion of the invisible rays, comprising two interconnected sealed gas containers of a medium adapted to similarly absorb the infra-red rays having a movable seal therebetween, the walls of one container being constructed of a transparent medium and the walls of the other of a medium adapted to absorb a part of the rays of the visible spectrum exclusive of the invisible rays, whereby when the device is subjected to light, the absorption of the infra-red rays maintains a balance of pressure in the two containers and the temperature of that container adapted to absorb the rays of the visible spectrum is increased, expands the contained gas and moves the interposed seal in the direction of the other container.

4. A device for transmuting the energy of visible light rays to operate an electric switch comprising two interconnected sealed gas containers having electrodes entering therein and a seal of electric conducting fluid therebetween, the walls of one container being constructed of a transparent media and the walls of the other of a medium adapted to absorb a part of the visible rays of the spectrum exclusive of the invisible rays, whereby when the device is subjected to visible light, the absorbed rays increase the temperature of the walls of that container, expand the gas contained therein, and impart a movement to the enclosed seal in the direction of the other container to engage or disengage said electrodes.

5. A device for transmuting the energy of visible light rays to operate an electric switch comprising two interconnected sealed gas containers having electrodes entering therein and a movable mercury seal therebetween, the walls of one container being constructed of a clear transparent media and the other medium adapted to absorb a part of the rays of the visible spectrum exclusive of the invisible rays and reflect the others, whereby when the device is subjected to the visible light, the absorbed rays increase the temperature of the walls of that container, expand the gas contained therein, and impart a movement to the mercury seal in the direction of the other container to engage or disengage the said electrodes.

6. A device for transmuting the energy of visible light rays for operating an electric switch comprising two interconnected sealed gas containers having electrodes entering therein and a movable seal of electric conducting fluid therebetween, the walls of one container being constructed of a transparent media and the walls of the other of a medium adapted to absorb a part of the visible spectrum, and a transparent screen adapted to absorb the infra-red rays interposed between the containers and the source of light, whereby the infra-red rays are prevented from falling upon the containers and the absorbed rays of the visible spectrum increasing the temperature of one of the containers to expand the gas contained therein and move the seal in the direction of the other container to engage or disengage the said electrodes.

7. A device for transmuting the energy of visible light rays comprising two interconnected sealed gas containers having electrodes entering therein and a mercury seal therebetween, the walls of one container being constructed of a clear transparent media and the walls of the other of a medium adapted to absorb part of the rays of the visible spectrum and reflect the others, and a transparent screen adapted to absorb infra-red rays and transmit the rays of the visible spectrum interposed between the containers and the source of light, whereby the rays of the visible spectrum to the exclusion of the other rays fall upon the containers and the absorbed rays of the visible spectrum increase the temperature of one container to expand the gas contained therein to move the mercury seal in the direction of the other container to engage or disengage the said electrodes.

8. A device for transmuting the energy of visible light rays to the exclusion of the invisible rays to operate an electric switch, comprising two interconnected sealed gas containers of a media adapted to similarly absorb the infra-red rays having electrodes entering therein and a seal of electric conducting fluid therebetween, the walls of one container being constructed of a transparent media and the walls of the other of a media adapted to absorb a part of the rays of the visible spectrum, whereby when the device is subjected to light, the absorption of the infra-red rays maintains a balance of pressure in the two containers and the temperature of that container adapted to absorb the rays of the visible spectrum is increased therebeyond, expands the contained gas and moves the fluid seal in the direction of the other container to engage or disengage the said electrodes.

9. A device for transmuting the energy of visible light rays to the exclusion of the invisible rays to operate an electric switch, comprising two interconnected sealed gas containers of a media adapted to similarly absorb the infra-red rays having electrodes entering therein and having a mercury seal therebetween, the walls of one container being constructed of a clear transparent media and the walls of the other of a medium adapted to absorb part of the rays of the visible spectrum and reflect the other rays, whereby, when the device is subjected to light, the absorption of the infra-red rays maintains a balance of pressure in the two containers and the temperature of that container adapted to absorb the rays of the visible spectrum is increased, expanding the contained gas and moving the mercury in the direction of the other container to engage or disengage the said electrodes.

10. A device for transmuting the energy of visible light rays to operate an electric switch, comprising two interconnected sealed glass containers having electrodes entering therein and a seal of electric conductor fluid therebetween, the walls of one container being formed of a clear transparent glass and the walls of the other of a colored glass which absorbs the rays of the visible spectrum exclusive of the invisible rays not reflected therefrom, whereby when the device is subjected to visible light, the absorbed rays increase the temperature of the walls of that container, expand the gas contained therein and impart a movement to the enclosed fluid seal in the direction of the other container to engage or disengage the said electrodes.

11. A device for transmuting the energy of visible light rays to operate an electric switch comprising two interconnected glass sealed gas containers having electrodes entering therein and a mercury seal therebetween, the walls of one container being of a clear transparent glass and the walls of the other of a colored glass adapted to absorb certain rays of the spectrum exclusive of the invisible rays not reflected, and a transparent glass screen adapted to absorb the certain other rays interposed between the containers and source of light, whereby the last mentioned rays are prevented at all times from falling upon the containers and the absorbed rays of the visible spectrum increase the temperature of the walls of the colored container, expand the gas contained therein and moves the mercury seal in the direction of the other container to engage or disengage the electrodes.

12. A device for transmuting the energy of visible light rays to the exclusion of the invisible rays comprising two interconnected glass sealed gas containers, both of which are adapted to similarly absorb the infra-red rays, electrodes sealed in the walls of such containers, and a mercury seal in the connection between the containers, the walls of one container being of a clear transparent glass and the walls of the other of a colored glass adapted to absorb those rays of the visible spectrum not reflected, whereby when the device is subjected to light, the absorption of the infra-red rays maintains a balance of pressure in the two containers and the additional absorption of the rays of the visible spectrum by the colored container increases the temperature thereof, expands the contained gas and moves the mercury seal in the direction of the other container to engage or disengage the said electrodes.

13. A device for transmuting the energy of light rays, comprising two interconnected sealed gas containers having a movable seal therebetween, the walls of one container being constructed of a transparent medium and the walls of the other of a medium adapted to absorb a part of the rays of the spectrum exclusive of the invisible rays, whereby when the device is subjected to light, the absorbed rays increase the temperature of the walls of that container, expand the gas contained therein, and impart a movement to the enclosed seal in the direction of the other container.

14. A device for transmuting the energy of light rays to operate an electric switch comprising two interconnected sealed gas containers having electrodes entering therein and a seal of electric conducting fluid therebetween, the walls of one container being constructed of a transparent media and the walls of the other of a medium adapted to absorb a part of the rays of the spectrum exclusive of the invisible rays, whereby when the device is subjected to light, the absorbed rays increase the temperature of the walls of that container, expand the gas contained therein, and impart a movement to the enclosed seal in the direction of the other container to engage or disengage said electrodes.

15. A device for transmuting the energy of visible light rays to operate an electric switch comprising two interconnected glass sealed gas containers having electrodes entering therein and a mercury seal therebetween, the walls of one container being of a clear transparent glass and the walls of the other of a colored glass adapted to absorb the rays of the visible spectrum not reflected, and a transparent glass screen adapted to absorb the infra-red rays interposed between containers and source of light, whereby the infra-red rays are prevented at all times from falling upon the containers and the absorbed rays of the visible spectrum increase the temperature of the walls of the colored container, expand the gas contained therein and moves the mercury seal in the direction of the other container to engage or disengage the electrodes.

IRA E. McCABE.